United States Patent
Bahram Pour (10) Patent No.: US 9,326,226 B2
(45) Date of Patent: Apr. 26, 2016

(54) BEACON DISCOVERY SERVICE

(71) Applicant: Microsoft Technology Licensing, LLC, Redmond, WA (US)

(72) Inventor: Bahram Bahram Pour, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/454,940

(22) Filed: Aug. 8, 2014

(65) Prior Publication Data

US 2016/0044583 A1 Feb. 11, 2016

(51) Int. Cl.
| | |
|---|---|
| *H04W 48/16* | (2009.01) |
| *H04W 40/24* | (2009.01) |
| *H04W 4/00* | (2009.01) |
| *H04W 4/02* | (2009.01) |
| *H04W 76/02* | (2009.01) |

(52) U.S. Cl.
CPC .............. *H04W 48/16* (2013.01); *H04W 4/008* (2013.01); *H04W 4/02* (2013.01); *H04W 40/244* (2013.01); *H04W 76/021* (2013.01)

(58) Field of Classification Search
CPC .............................. H04W 48/16; H04W 4/008
USPC .......................... 455/456.3, 411, 456.1, 456.2
See application file for complete search history.

(56) References Cited

U.S. PATENT DOCUMENTS

| | | | | |
|---|---|---|---|---|
| 7,835,732 | B2 * | 11/2010 | Simons ................. | H04L 12/189 455/422.1 |
| 2014/0135042 | A1 * | 5/2014 | Buchheim ................. | G01S 1/68 455/456.6 |
| 2015/0018011 | A1 * | 1/2015 | Mendelson .......... | G01C 21/206 455/456.3 |
| 2015/0120504 | A1 * | 4/2015 | Todasco ............... | G06Q 20/322 705/26.61 |
| 2015/0140982 | A1 * | 5/2015 | Postrel ................... | H04W 4/008 455/418 |
| 2015/0199672 | A1 * | 7/2015 | Woloshin .............. | H04W 4/008 705/39 |

FOREIGN PATENT DOCUMENTS

| | | |
|---|---|---|
| EP | 2136578 A1 | 12/2009 |
| WO | 0215601 A2 | 2/2002 |

OTHER PUBLICATIONS

Thompson, Doug, "Developing an iBeacon App", Published on: Dec. 25, 2013, Available at: http://beekn.net/developing-ibeacon-app/.
"The Next Big Thing Indoor Location Beacon Tag & Solutions", Retrieved on: Jul. 4, 2014, Available at: https://www.sticknfind.com/indoornavigation.aspx.

(Continued)

*Primary Examiner* — Qutbuddin Ghulamali
(74) *Attorney, Agent, or Firm* — Jim Banowsky; Harri Valio; Micky Minhas (57) ABSTRACT

A method that includes acts for resolving information about an entity associated with a beacon is illustrated. The method includes receiving a beacon signal. The beacon signal includes an identifier. The identifier is sent to a beacon resolution service. The method further includes receiving information identifying an entity associated with the beacon signal. Service information identifying one or more service categories for the identifier is also received. The method includes identifying one or more applications from among a plurality of beacon aware applications that are interested in one or more of the service categories sending information identifying the entity to the one or more applications.

17 Claims, 3 Drawing Sheets

(56) References Cited

OTHER PUBLICATIONS

Plante, Edouard, "In-store product discovery", Published on: Feb. 27, 2013, Available at: http://www.digitalforreallife.conn/2013/02/in-store-product-discovery/.

Edgin, Brian, "Beacons: Part 1—Technology", Published on: Jun. 12, 2014, Available at: http://clickherelabs.com/2014/06/beacons-part-1-technology/.

Benedic, Kevin, "How iBeacons Work for Indoor Location Based Services—Technical Guide and Recommendations", Published on: May 6, 2014, Available at: http://it.toolbox.com/blogs/kevin-benedict/how-ibeacons-work-for-indoor-location-based-services-technical-guide-and-recommendations-61186.

"iBeacons", Published on: Feb. 18, 2014, Available at: http://www.techjini.com/blog/ibeacons/.

"Cloud Beacons", Retrieved on: Jul. 4, 2014, Available at: http://www.cloud-beacon.com/.

Cheney, Steve, "On the New Edge Network and the Future of Local Commerce", Published on: Apr. 26, 2014, Available at: http://stevecheney.com/on-the-new-edge-network-and-the-future-of-local-commerce/.

Oros, et al., "Onyx Beacom", Retrieved on: Jun. 25, 2014, Available at: http://onyxbeacon.com/#onyx-beacons-advanced.

"International Search Report and Written Opinion Issued in PCT Application No. PCT/US2015/043898", Mailed Date: Nov. 5, 2015, 12 Pages.

"Insight Paper Beacon Technology—Improving the Customer Service Experience", Retrieved from <<http://www.futuretravelexperience.com/wp-content/uploads/2014/03/insight-paper-beacons.pdf, Mar. 14, 2014, 4 Pages.

* cited by examiner

BEACON DISCOVERY SERVICE

BACKGROUND

Background and Relevant Art

Bluetooth low energy devices can notify nearby devices of their presence by sending a beacon signal containing a universally unique identifier (UUID). The Bluetooth low energy devices are often referred to as beacons. Typically, an app developer for a mobile device will deploy beacons or have beacons deployed at various locations. The app is programmed to perform functionality based on detecting a beacon UUID. Presently, each UUID is targeted to a specific app. Thus, a given location may have several beacons for use with different apps. Such apps may be, for example, apps that provide customized advertisements, location tracking, automatic payments, or other functions. As can be imagined, proliferation of apps results in scaling problems as each new app will require new beacons placed at various locations for the new app.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated, herein includes a method that includes acts for resolving information about an entity associated, with a beacon, the method includes receiving a beacon signal. The beacon signal includes an identifier. The identifier is sent to a beacon resolution service. The method further includes receiving information identifying an entity associated with the beacon signal. Service information identifying one or more service categories for the identifier is also received. The method includes identifying one or more applications from among a plurality of beacon aware applications that are interested in one or more of the service categories sending information identifying the entity to the one or more applications.

In another embodiment, a method of providing identifier information for a beacon is illustrated. The method, includes at a beacon resolution service, receiving a beacon identifier from a device. Using the identifier, an entity associated with the beacon identifier is identified. Also using the identifier, one or more service categories for the entity associated with the beacon are identified. Information identifying the entity and one or more service categories for the entity are provided to the device, whereafter the device uses the information identifying one or more service categories to identify one or more applications from among a plurality of beacon aware applications that are interested in the one or more service categories.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained, by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited, and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein implement a beacon resolution service that allows a single beacon to be used across multiple applications. Embodiments may further include functionality for providing enhanced information to applications and systems using beacon information.

In particular, embodiments may implement a beacon resolution service that correlates UUIDs for beacons with information identifying entities associated with beacons and service information indicating services that a beacon is associated with. Thus, a device can receive a beacon UUID and send the beacon UUID to a beacon resolution service. The beacon resolution service can respond with information identifying an entity associated with the beacon UUID and services associated with the beacon. The device can then filter on the information identifying services associated with the beacon to identify applications (or so called apps) at the device that might be interested in the services provided by the beacon. Once applications have been identified, information can be sent to the applications, where the applications can implement their functionality using the services provided by the beacon.

Figure 1:
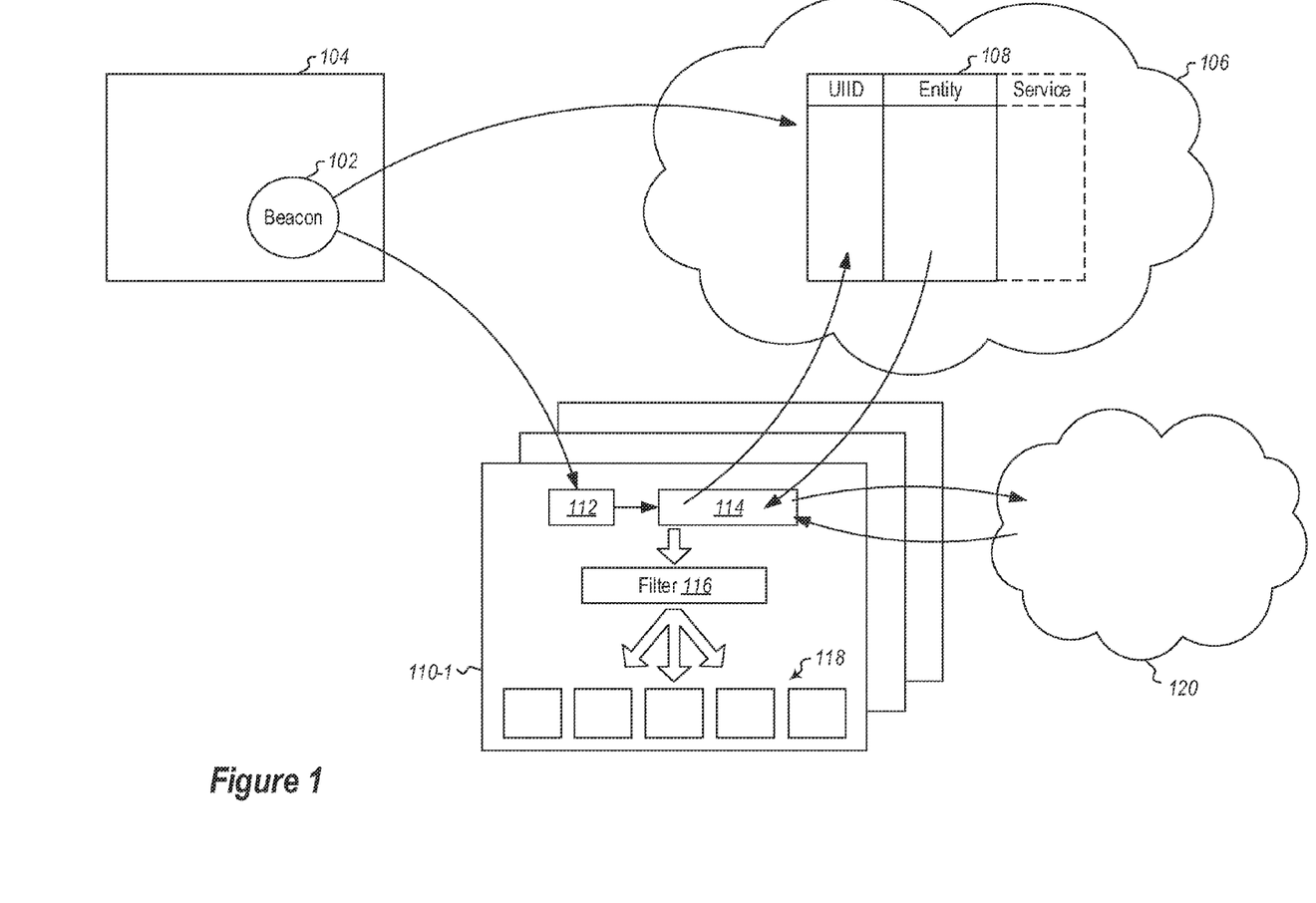
FIG. 1 illustrates a beacon, device and beacon resolution service.

Additional details are now illustrated with reference to FIG. 1. FIG. 1 illustrates a beacon 102. The beacon may be installed at a physical location 104. For example, the physical location may be a retail store, a department of a retail store, a service provider, or virtually any other physical location that one might be able to imagine. The beacon 102 transmits a UUID. Typically, a beacon will continue to transmit this UUID and essentially nothing else (however, embodiments are not limited to only beacons that operate in this manner).

An entity, such as an organization that maintains the beacon 102, or other entity associated with the beacon, may register the beacon with a beacon resolution service 106. The beacon resolution service 106 may be a so-called "cloud" or remotely accessed service that allows entities to contact the service 106 through wide area networks such as the Internet.

The beacon resolution service 106 maintains a database 108 of registered beacons. For beacons that have been registered with the beacon resolution service 106, the database 108 may correlate beacon UUIDs with information identifying one or more entities associated with the beacons, such as the organizations maintaining the beacons, the locations of the beacons or other entities, and information about services associated with the beacons. Thus, for example, the database 108 may correlate a UUID of the beacon 102 to the physical location 104 and may further include information identifying that the beacon 102 can be used to provide advertising, discount coupons, automatic payment and location services.

FIG. 1 further illustrates a device 110-1. The device 110-1 may be, for example, a user or consumer device such as a cellular phone, tablet, or other device. The device 110-1 includes a radio receiver 112. The radio receiver 112 includes functionality for detecting a signal output by the beacon and identifying the UUID contained in the signal. The radio receiver 112 can pass this information on to a control module 114. In some embodiments, the control module 114 may be part of the operating system of the device 110-1. Alternatively, the control module 114 may be part of an application hosting framework that hosts beacon aware applications on the device 110-1. The control module 114 may be implemented in other fashions or contexts as well.

The control module 114 can send the UUID of the beacon 102 to the beacon resolution service 106. At the beacon resolution service 106, the database 108 will be consulted to determine additional information about the beacon, such as its location and/or entities that are responsible for the beacon, and services that the beacon is associated with. This information can be sent back to the control module 114. The control module 114 can pass this information to a filter 116. In some embodiments, the filter 116 may be incorporated into the control module 114 or external to the control module 114. The filter 116 may have a registration of applications on the device 110-1 that includes a listing of applications and the services that they are interested in. The filter 116 can use the information from the beacon resolution service 106 to determine what applications are interested in the services associated with beacon 102. The filter 116 can then alert the interested applications in the set of application 118. These applications then know that they are in the proximity of the beacon 102 and can implement functionality associated with identifying that a beacon is in close proximity.

Thus, the beacon resolution service 106 can resolve UUIDs into other information like location, advertisements, automatic payment, etc. Therefore applications and devices do not need to maintain many IDs for different scenarios. Further, the applications do not need to maintain the UUIDs, but rather can just use the beacon resolution service 106 as a translator.

In the illustrated example, above, there are two major cooperating components, a so called server and a so called client.

On the server side, a cloud service (e.g. beacon resolution service 106) may be implemented. Beacon transmitters (e.g. beacon 102) register to this service to receive a UUID (or they can register their UUID that they already have if it is available). As part of registration they will define the extension services that they provide for every beacon discovery. This service will resolve any UUID to the list of services that are provided for that UUID.

On the client side, is a client service (e.g. the control module 114 and potentially the filter 116). The beacon 102 transmitter will notify the nearby device 110-1 by sending a UUID to it. The client service will detect the beacon notification and will resolve it into available services for that location via the beacon resolution service 106. After finding available services for that location the client service will notify any interested app about available services.

The following now illustrates an example of where an advertisement service is implemented. In this example, a company manages a chain of stores at which they want to show local ads to any customer that enter these stores. The company registers their ad service with the beacon resolution service (e.g. beacon resolution service 106). As part of registration for each beacon (e.g. beacon 102) they will provide their ad service and a store information service.

A customer with an enabled beacon receiver device (e.g. device 110-1) enters to one of the companies store (e.g. a store at location 104). A client service (such as the control module 114) will detect a beacon notification from the beacon 102 and will receive the UUID. The client service (e.g. control module 114) will query the beacon resolution service 106 using the UUID. In response the control module 114 will receive information about the location 104 and available services for that location. In some embodiments, the information may be received directly from the beacon resolution service 106. Alternatively or additionally, embodiments may identify services by calling back to another service 120 maintained by the company, or some other third party.

In the illustrated example, one of the available services for the beacon 102 is an ad service provided by the company. In some embodiments, the control module 114 will receive the ads from service 120. The control module 114 will send ad notifications to the interested apps. Any interested app can show received local company provided ads.

In an alternative example, rather than the control module 114 receiving the ads, the control module 114 can simply notify interested, apps about information regarding the beacon. Such information may include information about the company, the location 104, a URL identifying where ads can be obtained, or any other appropriate information. Using this information, the interested apps can then obtain the ads directly from the service 120.

The following now illustrates another example where a location service is provided. In this example, a company may want to write an app that enables tracking devices. Currently the GPS devices may not work inside buildings such that they could not be used to track devices (e.g. device 110-1) inside buildings. However, with beacon technology and a beacon resolution service 106, tracking inside of buildings can be enabled.

In the illustrated example, a customer with a beacon enabled device 110-1 will enter a location 104. The control module 114 will detect the beacon notification including the UUID. The control module 114 will query the beacon resolution service 106 and will receive the location's information, which may include the address. The location information may be received, directly from the beacon resolution service 106 from information stored at the beacon resolution service database 108. Alternatively, some of the information (such as the address information) may be obtained by the control module 114 from the service 120. In yet another alternative embodiment, the beacon resolution service 108 may provide the control module 114 with sufficient information such that the control module 114 (or an appropriate app) may be able to obtain the address directly from the service 120.

However, in the illustrated example, the control module 114 will send the location notification to the interested apps at the device 110-1, including an app provided by the company. The company app will receive the location information and can add it to the track list without knowing anything about beacon UUID.

While various communication patterns have been illustrated for the location service, it should be appreciated, that the same or similar patterns could be used for other services. Still, yet other patterns may be used to provide the information to applications.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
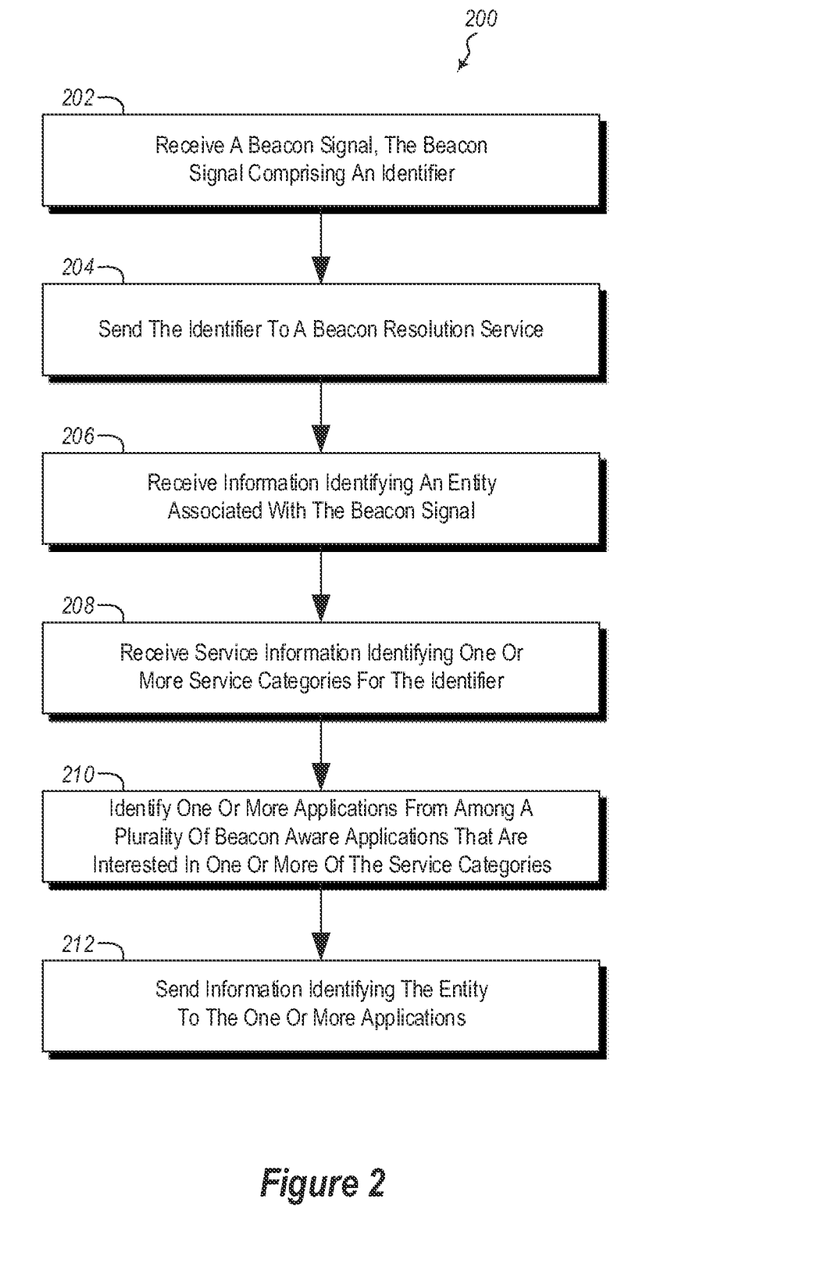
FIG. 2 illustrates a method of resolving information about an entity associated with a beacon.

Referring now to FIG. 2, a method 200 is illustrated. The method 200 includes acts for resolving information about an entity associated with a beacon. The method includes receiving a beacon signal (act 202). The beacon signal includes an identifier. For example, as illustrated in FIG. 1, the beacon 102 can send a signal that is received by the device 110-1 at the control module 114. The signal may include a UUID for the beacon 102.

The method 200 further includes sending the identifier to a beacon resolution service (act 204). Thus, for example, the device control module 114 of the device 110-1 may send the UUID to the service 106, where the service 106 is able to identify an entity associated with the UUID by consulting the database 108.

The method further includes receiving information identifying an entity associated with the beacon signal (act 206). As illustrated in FIG. 1, the control module 114 may receive information from the service 106 that includes information identifying the entity associated with the UUID.

The method 200 further includes receiving service information identifying one or more service categories for the identifier (act 208) For example, this information may be included in the database 108 and may be received in conjunction with the entity information. Alternatively or additionally, this information could be requested from another service, such as the service 120, once the control module 114 has the entity information. For example, the control module 114 may query the service 120 using the entity information to identify service categories for the entity.

The method 200 further includes identifying one or more applications from among a plurality of beacon aware applications that are interested in one or more of the service categories (act 210). For example, FIG. 1 illustrates a set of applications 118. The applications in the set of applications 118 may register with the control module 114 as to what service categories they are interested in. This allows the control module to determine service category and application correlations.

The method 200 further includes sending information identifying the entity to the one or more applications (act 212). For example, the control module, using the identified interest, can send information to the applications in the set of applications 118 including information identifying the entities. The notified applications would, then be aware that the device 110-1 is in the presence of a beacon associated with an entity.

The method 200 may be practiced where the information identifying the one or more service categories for the identifier is received from a different entity than the beacon resolution service. For example, as illustrated above, rather than receiving service category information from the service 106, service category information may be obtained from the service 120.

The method 200 may further include sending information identifying the one or more service categories to the one or more applications. Thus, rather than just sending entity information, service category information (such as location, advertisements, automatic payments, etc.)

The method 200 may further include using the information identifying the entity to obtain additional information about the entity. For example, the control module 114 or an application could contact a service, such as the service 106 or 120. Such information may be offers, advertisements, coupons, location, sales and promotions, services, sub-locations (such as make-up counter, shoes, home, men's, women's, etc. in a department store), service level (such as a super store as opposed to a regular version of a store).

The method 200 may be practiced where one or more of the applications automatically perform some function based on receiving information identifying the entity. For example, an application may provide a coupon, cause a payment to be made, open an e-ticket (such as at an airport), etc. Thus, for example, applications may show some information and/or perform some action. One example may include an application launching a music application when in the presence of a beacon (such as a beacon in a car). Another example may include causing the device 110-1 to be put on silent (such as putting a phone on vibrate in a movie theater on detecting a beacon associated with a movie theater). Another example may include using a home control application to turn lights on, start air conditioning, play music, etc. Another example may include applications where a meeting room beacon causes an application to transmit information that can be displayed to everyone in meeting.

The method 200 may further include one or more of the applications that are provided information identifying the entity contacting a server to obtain additional information. Thus, for example, an application in the set of applications 118 may contact the service 106 or service 120 (or other appropriate service) to obtain information such as physical location information, advertisements, automatic payment information, etc. The service may be a third party service different than the beacon resolution service. Alternatively, this information may be available from the beacon resolution service.

The method 200 may be practiced where information identifying one or more service categories for the identifier is received at a filter. The filter determines what applications are interested in the additional information. The filters may be based on services offered. In such applications, this embodiment may include receiving registration information form applications registering service categories that the applications are interested in.

Figure 3:
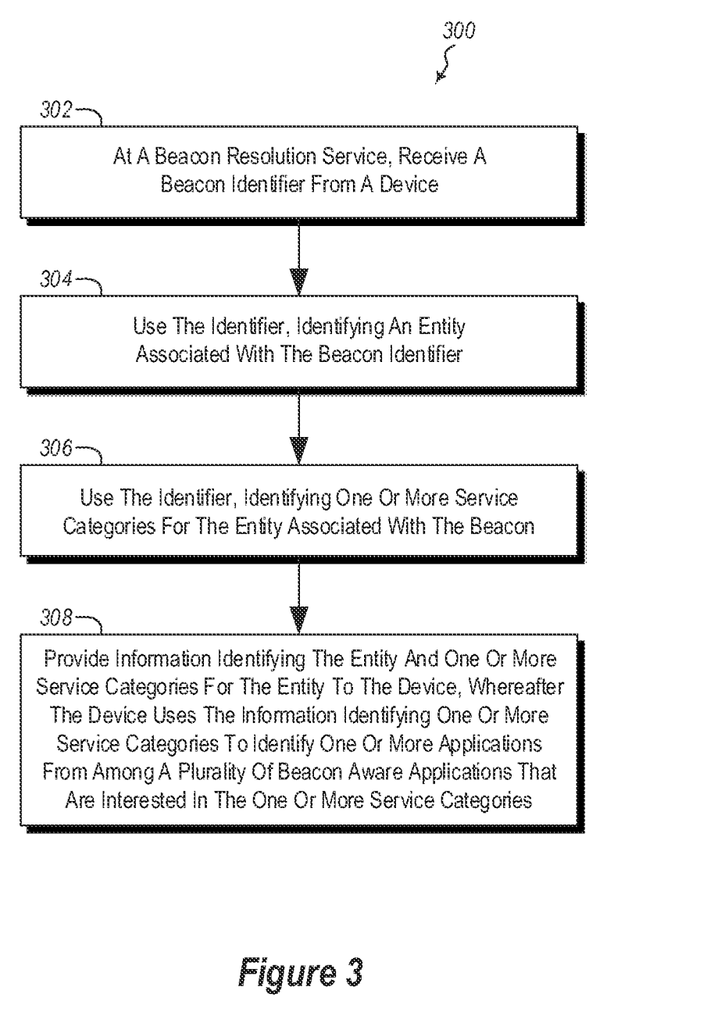
FIG. 3 illustrates a method of providing identifier information for a beacon.

Referring now to FIG. 3, another method 300 is illustrated. The method 300 includes acts for providing identifier information for a beacon. The method includes at a beacon resolution service, receiving a beacon identifier from a device (act 302).

The method 300 further includes using the identifier, identifying an entity associated with the beacon identifier (act 304).

The method 300 further includes using the identifier, identifying service categories for the entity associated with the beacon (act 306). Note that service categories are generalized descriptions of the types of services an entity may provide. For example, a service category might be location, indicating that an entity can provide location information, although no actual location information may be provided. Similarly, a service category may be advertisements, indicating that an entity can provide advertisement information, but the service category information does not include the actual advertisements.

The method further includes providing information identifying the entity and service categories for the entity to the device, whereafter the device uses the information identifying service categories to identify applications from among a plurality of beacon aware applications that are interested, in the one or more service categories (act 308).

The method 300 may be practiced where the service category information is stored at the beacon resolution service.

The method 300 may be practiced where the service category information is stored at an external service. For example, the beacon resolution service could, obtain the service category information from an external service. Alternatively, a device could, get service category information from an external service.

The method 300 may further include, receiving registration information for the entity associated with the identifier. In particular, an entity could be registered with a beacon resolution service to provide information allowing the beacon resolution service to correlate a UUID for a beacon with an entity. Such embodiments could, also receive service category information for entities, and in some embodiments, specific service information.

The method 300 may further include storing specific service information at the beacon resolution service. Such specific service information may include an actual geographic location for a location category, actual advertisements for an advertisement category, information needed to make automatic payments for an automatic payment category, etc.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined, as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included, within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended, claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used, include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated, by the appended claims rather than by the foregoing description. All changes which come within the meaning and range of equivalency of the claims are to be embraced within their scope.

What is claimed is:

1. A method implemented by a mobile device of resolving information about an entity associated with a beacon, the method comprising:

the mobile device receiving a beacon signal, the beacon signal including a particular beacon identifier;

the mobile device sending the particular beacon identifier to a beacon resolution service, wherein beacon resolution service comprises a database of a plurality of different beacon identifiers, including the particular beacon identifier, that are each registered with one or more different entities by the beacon resolution service and that also correspond to one or more service categories;

the mobile device receiving entity information from the beacon resolution service identifying one or more particular entities associated with the particular beacon identifier;

the mobile device receiving service information identifying one or more service categories corresponding with the particular beacon identifier by at least one of the database of the beacon resolution service or by a different entity that the beacon resolution service;

the mobile device filtering at least the received service information to identify one or more applications from among a plurality of beacon aware applications that are currently available on the mobile device that are interested in one or more of that registered service categories corresponding with the particular beacon identifier; and the mobile device providing information identifying the one or more particular entities or service categories to the one or more interested applications.

2. The method of claim 1, wherein the information identifying the one or more corresponding service categories for the particular beacon identifier is received from the different entity than the beacon resolution service.

3. The method of claim 1, further comprising using the information identifying the one or more particular entities to obtain additional information about the one or more particular entities.

4. The method of claim 1, wherein one or more of the applications automatically perform some function based on information identifying the one or more particular entities.

5. The method of claim 1, further comprising one or more of the applications that are provided information identifying the one or more particular entities contacting a server to obtain additional information.

6. The method of claim 1, comprising receiving registration information at the filter of the mobile device from applications registering service categories that the applications are interested in.

7. A method of providing identifier information for a beacon, the method comprising:

at a beacon resolution service, registering a plurality of different beacon identifiers and associated information in a beacon resolution service database, the plurality of different beacon identifiers corresponding to a plurality of different entities;

at a beacon resolution service, receiving a beacon identifier from a mobile device, the beacon identifier corresponding to at least one of the registered beacon identifiers in the beacon resolution service database;

using the beacon identifier, identifying an entity associated with the beacon identifier from the beacon resolution service database, the entity being one of the plurality of different entities;

using the beacon identifier, identifying one or more service categories for the entity associated with the beacon; and providing entity information identifying at least the entity associated with the beacon identifier to the device and providing service information that identifies the one or more service categories from an external service to the beacon resolution service, wherein the entity information and the service information are used to identify the one or more service categories to identify one or more applications from among a plurality of beacon aware applications that are interested in the one or more service categories.

8. The method of claim 7, wherein the service category information is stored at the beacon resolution service.

9. The method of claim 7, wherein the service category information is stored at an external service.

10. A mobile device comprising:

one or more processors;

a receiver;

one or more physical computer readable storage media comprising computer executable instructions that when executed by the one or more processors cause the following method to be performed:

the receiver receiving a beacon signal from a beacon, the beacon signal comprising a particular beacon identifier;

the control module sending the particular beacon identifier to a beacon resolution service, wherein the beacon resolution service comprises a database of a plurality of beacon identifiers, including the particular beacon identifier, that are each registered with one or more different entities by the beacon resolution service and that also correspond to one or more service categories;

the control module receiving entity information from the beacon resolution service identifying an entity associated with the particular beacon identifier and which is obtained from the database containing the plurality of different beacon identifiers registered with the one or more different entities;

the control module receiving service information identifying one or more service categories corresponding with the beacon identifier by at least one of the database of the beacon resolution service or by a different entity than the beacon resolution service;

the filter filtering at least the received service information to identify one or more applications from among a plurality of beacon aware applications that are currently available on the mobile device that are interested in one or more of the registered service categories associated with the particular beacon identifier; and the filter providing information identifying the entity and service categories to the one or more interested applications.

11. The mobile device of claim 10, wherein the service information identifying the one or more service categories for the particular beacon identifier is received from a different entity than the beacon resolution service.

12. The mobile device of claim 10, further comprising sending information identifying the one or more service categories to the one or more applications.

13. The mobile device of claim 10, further comprising using the information identifying the entity to obtain additional information about the entity.

14. The mobile device of claim 10, wherein one or more of the applications automatically perform some function based on information identifying the entity.

15. The mobile device of claim 10, further comprising one or more of the applications that are provided information identifying the entity contacting a server to obtain additional information.

16. The mobile device of claim 10, wherein information identifying one or more service categories for the particular beacon identifier is received at a filter, and wherein the filter determines what applications are interested in the additional information.

17. The mobile device of claim 10, wherein the database at the beacon resolution service associates the particular beacon identifier with a plurality of different entities that are registered with the beacon.

\* \* \* \* \*